(12) United States Patent
Lee et al.

(10) Patent No.: US 7,271,512 B2
(45) Date of Patent: Sep. 18, 2007

(54) STATOR OF OUTER ROTOR TYPE MOTOR FOR DRUM TYPE WASHER

(75) Inventors: Deug Hee Lee, Changwon-si (KR); Seung Bong Choi, Changwon-si (KR)

(73) Assignee: LG Electronics Inc., Seoul (KR)

( * ) Notice: Subject to any disclaimer, the term of this patent is extended or adjusted under 35 U.S.C. 154(b) by 215 days.

(21) Appl. No.: 11/037,026

(22) Filed: Jan. 19, 2005

(65) Prior Publication Data

US 2005/0189836 A1 Sep. 1, 2005

(30) Foreign Application Priority Data

Feb. 26, 2004 (KR) .................. 10-2004-0013000
Feb. 26, 2004 (KR) .................. 10-2004-0013001

(51) Int. Cl.
*H02K 1/04* (2006.01)
(52) U.S. Cl. .................. 310/43; 310/218; 310/254
(58) Field of Classification Search .................. 310/43, 310/45, 51, 91, 216–218, 254, 258
See application file for complete search history.

(56) References Cited

U.S. PATENT DOCUMENTS

| | | | | |
|---|---|---|---|---|
| 5,323,074 A | * | 6/1994 | Sakashita et al. | 310/43 |
| 5,508,578 A | * | 4/1996 | Suzuki et al. | 310/254 |
| 6,166,474 A | * | 12/2000 | Kohara et al. | 310/258 |
| 6,333,579 B1 | * | 12/2001 | Hirano et al. | 310/194 |
| 7,138,741 B2 | * | 11/2006 | Lee | 310/216 |
| 2004/0232789 A1 | * | 11/2004 | Lim et al. | 310/91 |

* cited by examiner

*Primary Examiner*—Dang Le
(74) *Attorney, Agent, or Firm*—Birch, Stewart, Kolasch & Birch, LLP (57) ABSTRACT

The present invention provides a stator of an outer rotor motor for a washing machine. The stator includes a ring type helical core, an upper insulator having a shape corresponding to a shape of the helical core to enclose an upper part of the helical core, a lower insulator having a shape corresponding to the shape of the helical core to enclose a lower part of the helical core, at least one locking part built in one body of the upper and lower insulators and projected from an inside of the helical core toward a center of the stator to fix the stator to a fixing side of a tub, a locking hole provided to the locking part to fix the stator to the fixing side of the tub via a locking member, and a rigidity reinforcement bracket provided between the upper and lower insulators.

41 Claims, 11 Drawing Sheets

STATOR OF OUTER ROTOR TYPE MOTOR FOR DRUM TYPE WASHER

This application claims the benefit of the Korean Application Nos. P2004-13000 and P2004-13001 both filed on Feb. 26, 2004, which is hereby incorporated by reference.

BACKGROUND OF THE INVENTION

1. Field of the Invention

The present invention relates to a drum type washer, and more particularly, to a stator of an outer rotor type BLDC motor, which is applicable to a direct coupling type drum type washer.

2. Discussion of the Related Art

Generally, a drum type washer performs washing in a manner of rotating a drum, in which a laundry, detergent, and water are put, by a drive force of a motor using friction between the water and the laundry. The drum type washer causes almost no damage to the laundry, prevents raveling of the laundry, and brings about effects of beating and rubbing.

Drum type washers are categorized into an indirect coupling type and a direct coupling type according to a drive system. In the indirect coupling type, a drive force of a motor is indirectly transferred to a drum via a motor pulley and a belt wound of the drum pulley. In the direct coupling type, a rotor of a BLDC motor is directly coupled with a drum to directly transfer a drive force to the drum.

Yet, in the indirect coupling type system that transfers the drive force of the motor to the drum via the motor pulley and the belt wound on the drum pulley instead of transferring the drive force of the motor to the drum directly, energy loss occurs in the process of drive force transfer and considerable noise is generated.

Hence, the direct coupling drum type washer using the BLDC motor is widely used to solve the above problems of the drum type washer.

Figure 1:
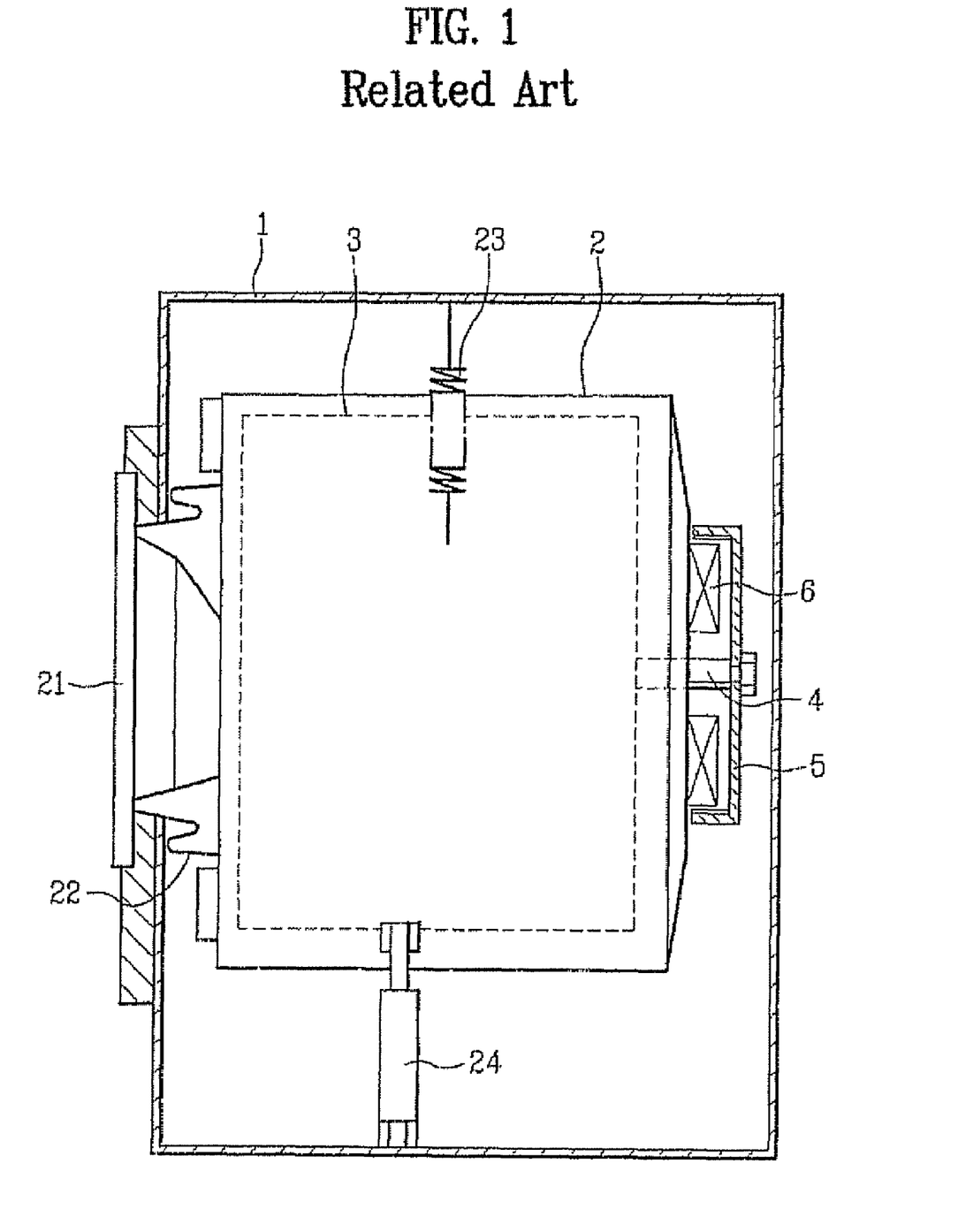
FIG. 1 is a cross-sectional diagram of a direct coupling drum type washer according to a related art.

FIG. 1 is a cross-sectional diagram of a direct coupling drum type washer according to a related art.

Referring to FIG. 1, a tub 2 is provided within a cabinet 1, and a drum 3 is rotatably provided within the tub 2.

A motor is provided to a rear portion of the tub 2. Specifically, a stator 6 is fixed to a rear wall of the tub 2 and a rotor 5 encloses the stator 6 to be coupled to the drum 3 via a shaft.

A door 21 is provided to a front portion of the cabinet 1 and a gasket is provided between the door 21 and the tub 2.

A hanging spring 23 supporting the tub 2 is provided between an inside of a top portion of the cabinet 1 and an upper outer circumference of the tub 2, and a friction damper 24 is provided between an inside of a bottom portion of the cabinet 1 and a lower outer circumference of the tub 2 to attenuate vibration of the tub 2.

Figure 2:
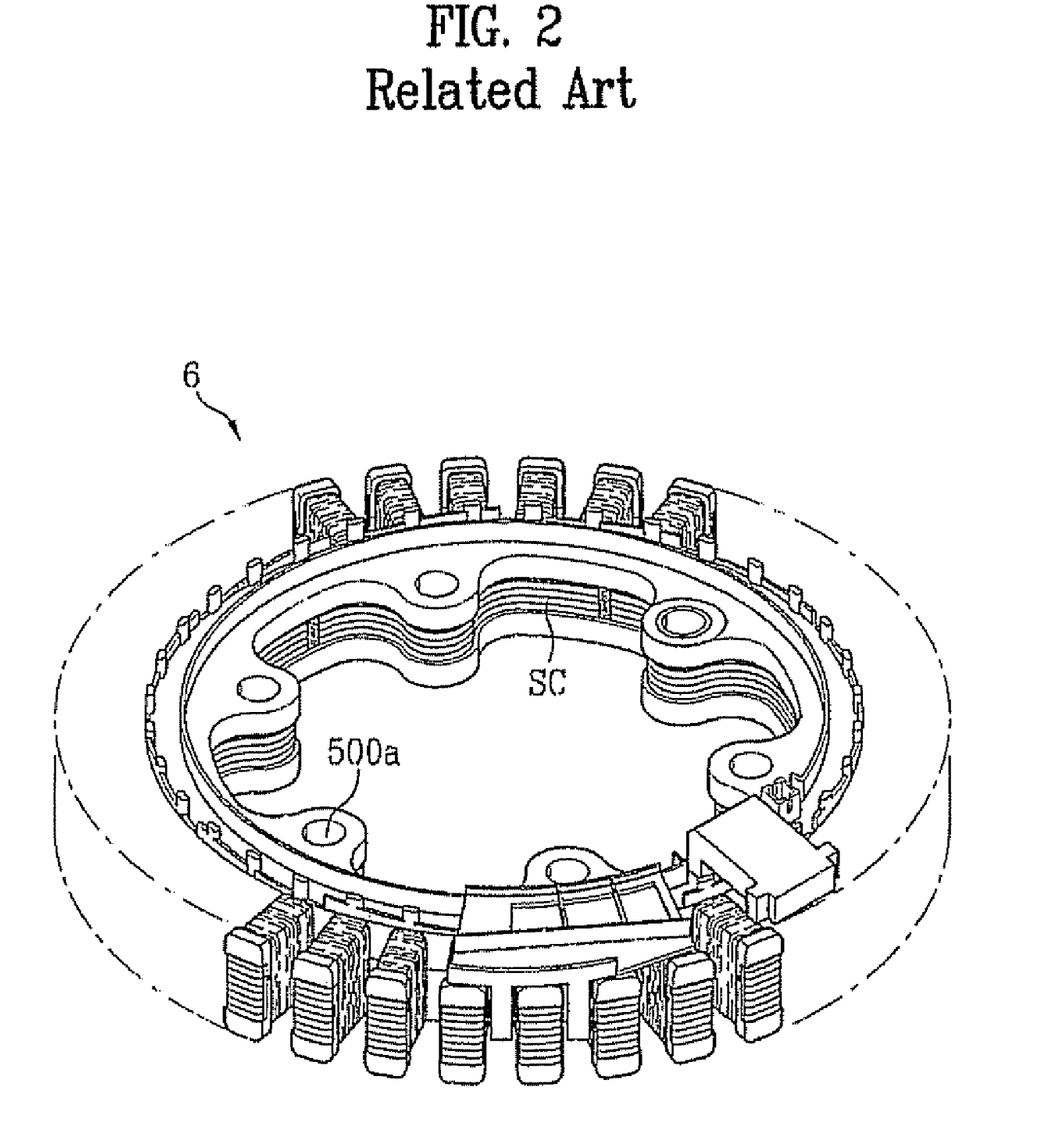
FIG. 2 is a perspective diagram of a stator according to a related art.
Figure 3:
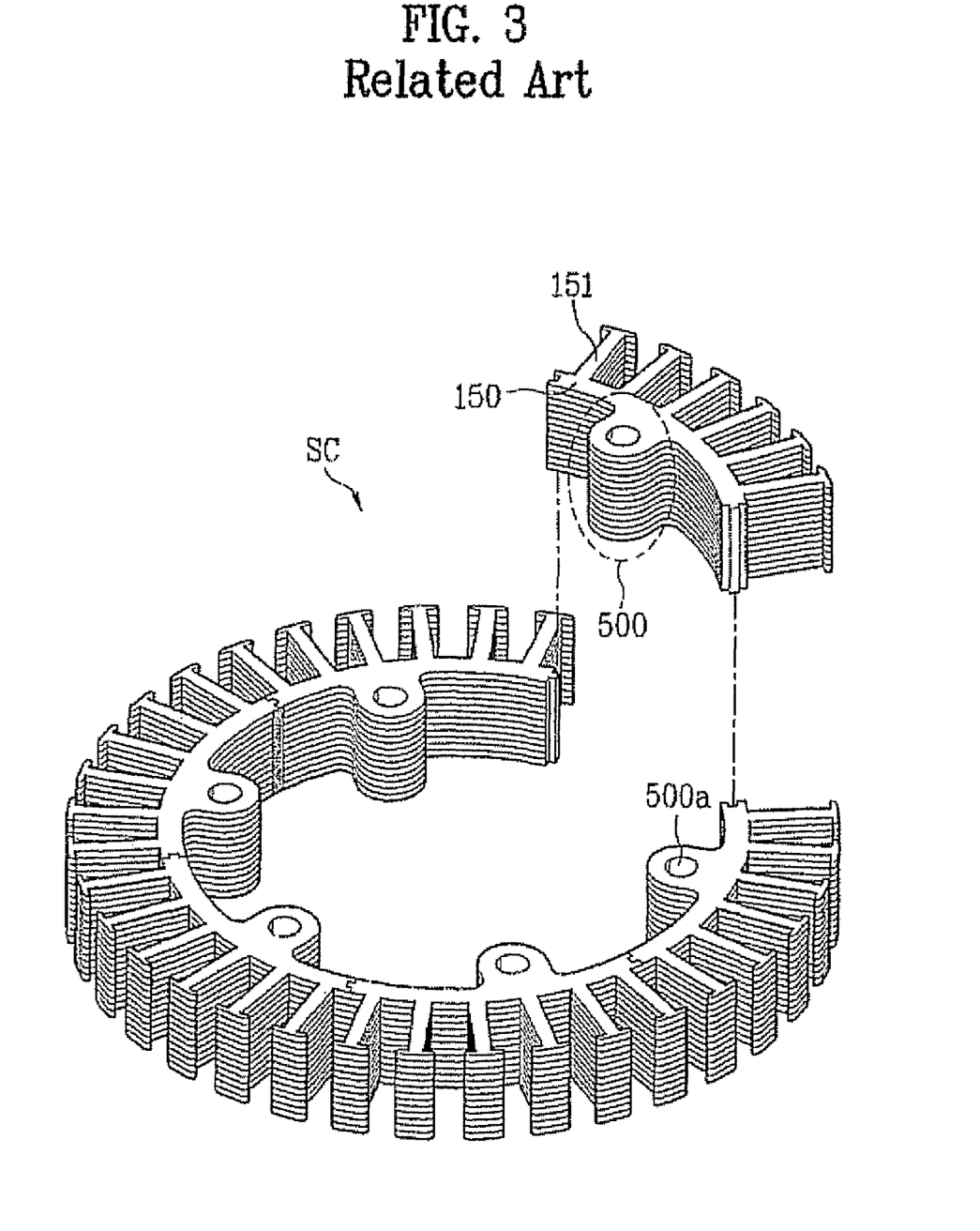
FIG. 3 is a perspective diagram of a sectional core (SC) applied to the stator in FIG. 2.

FIG. 2 is a perspective diagram of a stator in FIG. 1 and FIG. 3 is a perspective diagram of a sectional core (SC) applied to the stator in FIG. 2.

A method of manufacturing a stator core according to a related art is explained as follows.

First of all, a plurality of the unit cores are fabricated by a pressing process of a steel plate. In doing so, each of the unit cores consists of teeth 151, a base 150, and a protrusion 500 opposite to the teeth 151 for forming a locking hole 500a. A plurality of the unit cores are stacked to form a plurality of assemblies. And, a plurality of the assemblies are linked in a circumferential direction to complete a stator core that is so-called a stator core.

The protrusion 500 plays a role in standing a locking force of a bolt as well as provides the locking hole 500a necessary for locking a stator to the rear wall of the tub.

Yet, such a method of manufacturing the stator 6 with the sectional core SC is very complicated and brings about considerable loss of materials.

Meanwhile, a helical core, which is manufactured by helically stacking a steel plate consisting of teeth 151 and a base 150, is very useful in reducing the loss of materials and simplifying the manufacturing process. Yet, in manufacturing the helical core HC, the steel plate blanked like a strap needs to be helically bent. Hence, it is unable to provide a protrusion for coupling a stator with a tub to an inside of the core.

If the protrusion 500 is provided to the inside of the core in manufacturing the helical core HC, a core width of a part reserved for the protrusion is too large to bend the core.

Accordingly, a stator structure that enables the same role of the protrusion of the sectional core to be performed not by the core itself but by another portion is needed to be applicable to the helical core HC.

Meanwhile, it is important to sufficiently secure the rigidity of the protrusion provided with the locking hole for locking the stator to the tub, which is explained as follows.

First of all, in a washer that rotates a drum directly using a BLDC motor, a stator is directly assembled to a fixing side of a rear portion of the tub. If the stator of a motor for a high capacity drum type washer weighs over 1.5 kg and if a dewatering rotational speed is 600~2,000 RPM, a locking portion of the stator 6 is broken due to the stator weight, the vibration of the high rotation, and the shake and transformation of the rotor 5.

Specifically, in case that the stator is coupled with the rear wall of the tub of the drum type washer using the BLDC motor, a radial direction of the stator almost maintains parallel to a ground, the breakage of the locking portion of the stator 6 to the rear wall of the tub gets worsened due to the vibration occurring on driving the washer.

Therefore, it is important to sufficiently secure the rigidity of the protrusion provided with the locking hole for locking the stator 6 to the tub.

SUMMARY OF THE INVENTION

Accordingly, the present invention is directed to a stator of an outer rotor type motor for a drum type washer that substantially obviate one or more problems due to limitations and disadvantages of the related art.

An object of the present invention is to provide an outer rotor type motor for a drum type washer, by which a material and weight for fabrication are reduced, by which a fabrication process is simplified, and by which a stator can be stably assembled to a fixing side such as a tub or a bearing housing.

Another object of the present invention is to provide a stator of an outer rotor type motor for a drum type washer, in which a stator can be stably assembled to a fixing side such as a tub or a bearing housing and by which the stator weighing at least 1.5 kg is applicable to a drum type washer BLDC motor having a rotational speed over 2,000 RPM.

Another object of the present invention is to provide a stator, by which rigidity of the stator against bending and distortion is enhanced in a manner of providing a rigidity reinforcement bracket between upper and lower insulators configuring the stator.

A further object of the present invention is to provide a stator, by which rigidity of a locking part provided to upper and lower insulators configuring the stator is enhanced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stator of an outer rotor type motor for a drum type washer according to the present invention includes a ring type helical core having a multilayer structure configured by helically winding to stack a steel plate, which includes a strap type base and teeth protruding from the base, from a bottom layer to a top layer, an upper insulator having a shape corresponding to a shape of the helical core to enclose an upper part of the helical core and formed of an electrically insulating material, a lower insulator having a shape corresponding to the shape of the helical core to enclose a lower part of the helical core in being assembled to the upper insulator reciprocally and formed of the electrically insulating material, at least one locking part built in one body of the upper and lower insulators and projected from an inside of the helical core toward a center of the stator to fix the stator to a fixing side of a tub, a locking hole provided to the locking part to fix the stator to the fixing side of the tub via a locking member, and a rigidity reinforcement bracket provided between the upper and lower insulators.

In another aspect of the present invention, a stator of an outer rotor type motor for a drum type washer includes a ring type helical core having a multi-layer structure configured by helically winding to stack a steel plate, which comprises a strap type base and teeth protruding from the base, from a bottom layer to a top layer, an upper insulator having a shape corresponding to a shape of the helical core to enclose an upper part of the helical core and formed of an electrically insulating material, a lower insulator having a shape corresponding to the shape of the helical core to enclose a lower part of the helical core in being assembled to the upper insulator reciprocally and formed of the electrically insulating material, at least one locking part built in one body of the upper and lower insulators and projected from an inside of the helical core toward a center of the stator to fix the stator to a fixing side of a tub, a boss provided to the locking part to form a locking hole for fixing the stator to the fixing side of the tub via a locking member, and a guide rib provided to each inside of non-exposed surfaces of the upper and lower insulators contacting with top and bottom of the spiral core to connect the adjacent bosses, the guide rib distributing the locking force focused on the bosses and reinforcing the rigidity off the locking parts.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Embodiments of the present invention are explained with reference to FIGS. 4 to 13B as follows.

First of all, one embodiment of the present invention is explained with reference to FIGS. 4 to 9 as follows.

Figure 4:
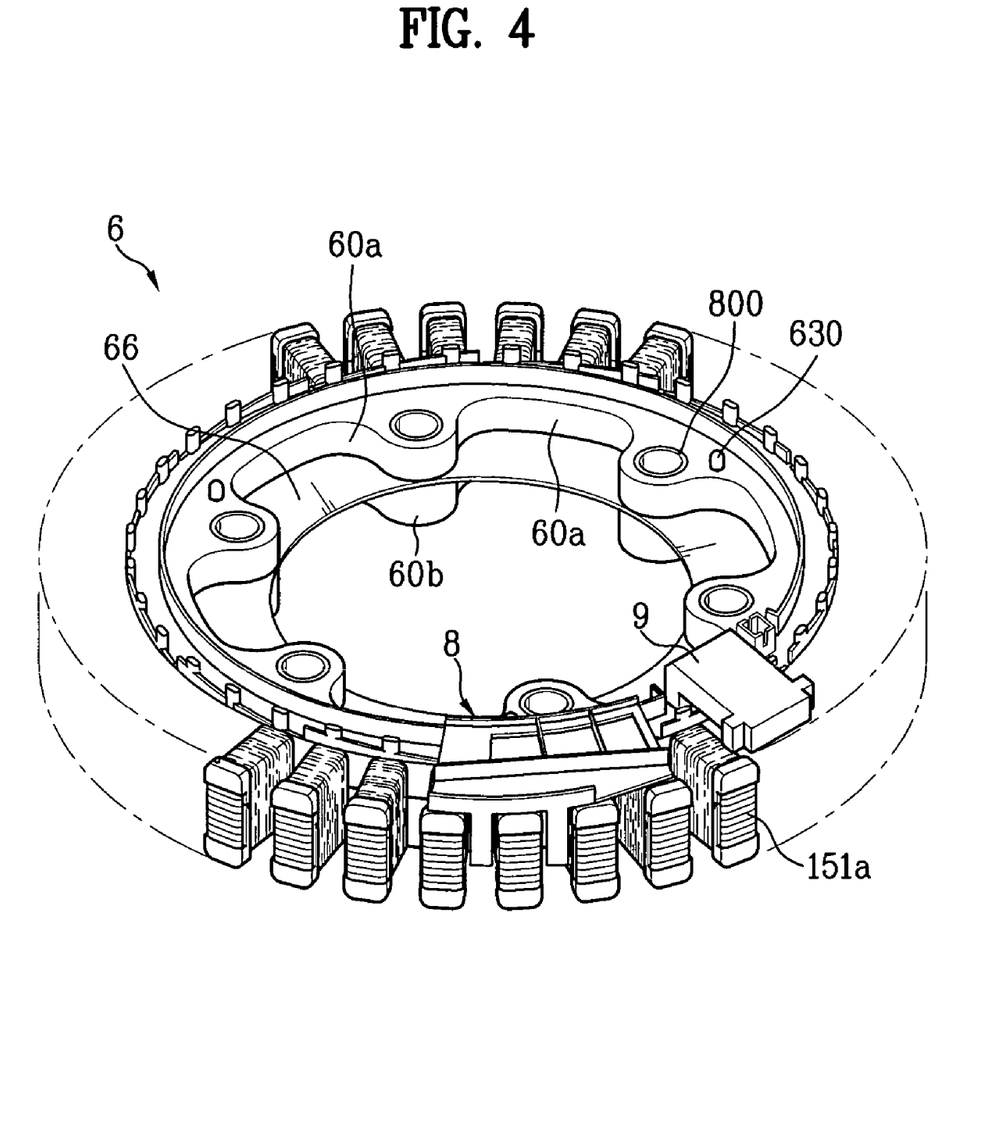
FIG. 4 is a perspective diagram of a stator according to the present invention.
Figure 5:
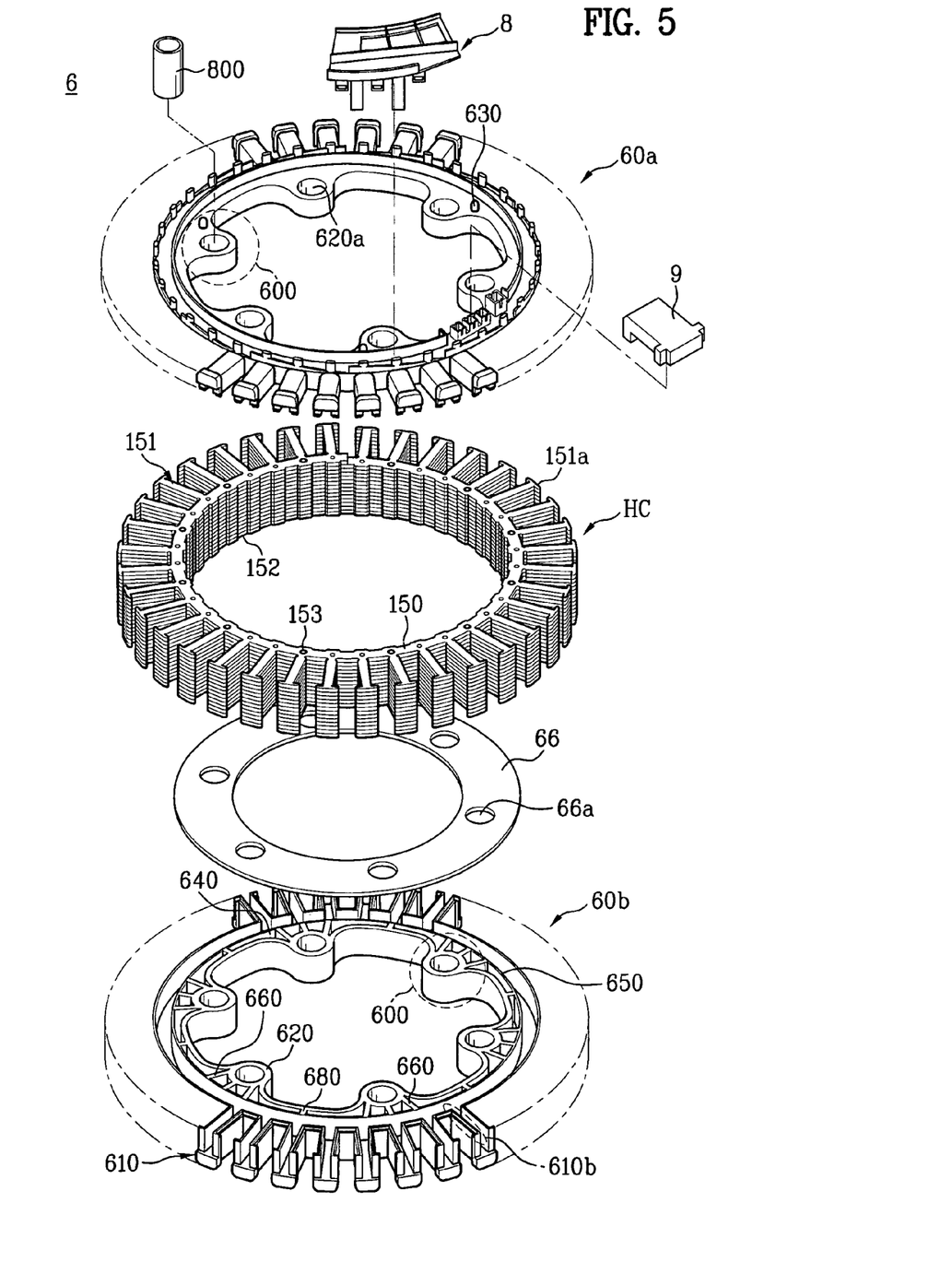
FIG. 5 is a projected perspective diagram of the stator in FIG. 4.
Figure 6:
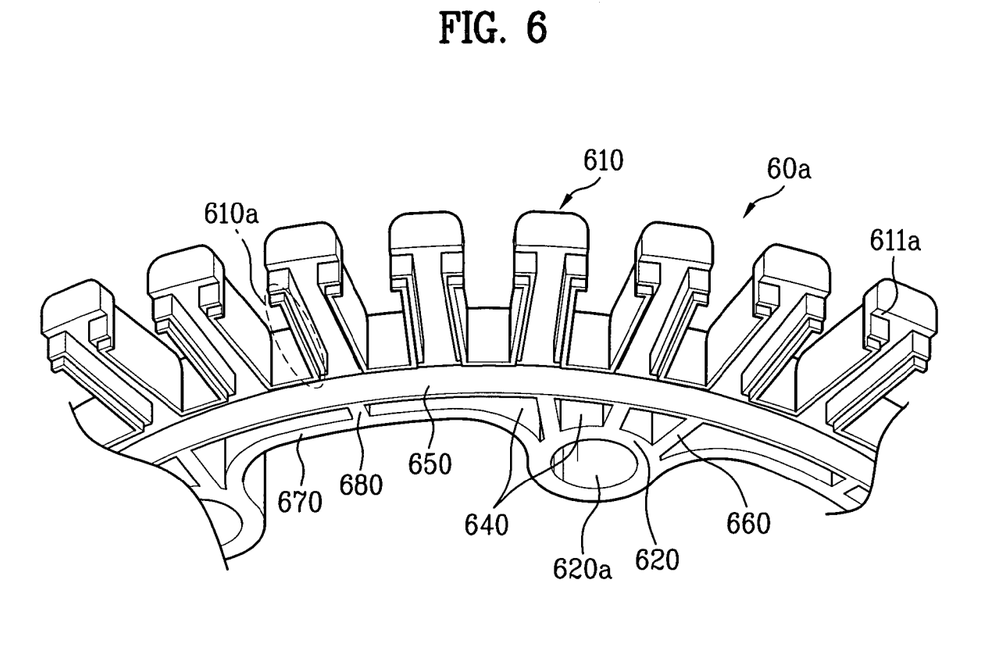
FIG. 6 is a perspective diagram of a backside of an upper insulator in FIG. 5.

FIG. 4 is a perspective diagram of a stator according to the present invention, FIG. 5 is a projected perspective diagram of the stator in FIG. 4, and FIG. 6 is a perspective diagram of a backside of an upper insulator in FIG. 5.

Referring to FIGS. 4 to 9, a stator 6 of an outer rotor type motor according to one embodiment of the present invention includes a ring type helical core HC having a multi-layer structure configured by helically winding to stack a steel plate, which includes a strap type base 150 and teeth 151 protruding from the base 150, from a bottom layer to a top layer, an upper insulator 60a having a shape corresponding to a shape of the helical core HC to enclose an upper part of the helical core HC and formed of an electrically insulating material, a lower insulator 60b having a shape corresponding to the shape of the helical core HC to enclose a lower part of the helical core HC in being assembled to the upper insulator 60a reciprocally and formed of an electrically insulating material, and at least three locking parts 600 built in one body of the upper and lower insulators 60a and 60b and projected from an inside of the helical core HC toward a center of the stator 6 to fix the stator 6 to a fixing side of a tub.

A locking hole 620a, as shown in FIG. 5, is provided to the locking part 600 to fix the stator 6 to the fixing side such as a tub via a locking member. And, the locking hole 620a is formed by a boss 620 projected toward a non-exposed surface of the locking part 600.

A support rib 650 is provided in a circumferential direction to each inside of non-exposed surfaces of the upper and lower insulators 60a and 60b contacting with top and bottom of the helical core HC, respectively to support a lateral inside of the core.

And, at least one reinforcement rib 660 is provided to the locking part 600 of the upper and lower insulators 60a and 60b to connect the boss 620 configuring the locking hole 620a to the support rib 650, thereby distributing a locking force concentrated on the boss 620 and reinforcing rigidity of the locking part 600.

Moreover, a reinforcement rib 670 is provided to a radially inner inside of each of the locking parts 600 of the upper and lower insulators 60a and 60b. And, at least one connecting rib 680 is provided between the reinforcement rib 670 and the support rib 650 supporting the lateral inside of the core to be connected in a radial direction.

Stepped portions 610a are provided to both sidewalls of each of the teeth 610 of the upper insulator 60a, respectively. And, stepped portions 610b are provided to both sidewalls of each of the teeth 610 of the lower insulator 60b, respectively. Hence, the stepped portions 610a and 610b engage with each other in assembling the upper and lower insulators 60a and 60b.

In this case, if one of the stepped portions 610a and 610b has a '⌐' shape, the other has a '⌐' shape.

The stepped portions 610a are further provided to tips of both of the sidewalls of each of the teeth 610 of the upper insulator 60a to be approximately vertical to the corresponding sidewalls, respectively. And, the stepped portions 610b are further provided to tips of both of the sidewalls of each of the teeth 610 of the lower insulator 60b to be approximately vertical to the corresponding sidewalls, respectively. Hence, the further-provided stepped portions 610a and 610b engage with each other in assembling the upper and lower insulators 60a and 60b.

Moreover, a loading surface 611a is provided to each end of the teeth 610 of the upper and lower insulators 60a and 60b so that a core shoe 151a of the helical core HC can be loaded thereon.

A location setting projection 630 is provided to a periphery of the locking hole 620a of the locking part 600 to engage with a location setting recess or hole (not shown in the drawing) provided to the fixing side such as a tub and the like.

A cylindrical sleeve 800 fitted in the locking hole 620a is a spring pin having elasticity by a cut portion or a hollow pin enabling its forcible insertion into the locking hole 620a and plays a role as a bushing.

Meanwhile, a rigidity reinforcement bracket 66 is inserted between the upper and lower insulators 60a and 60b to raise the rigidity of the upper and lower insulators 60a and 60b against the bending or distortion occurring in assembling the upper and lower insulators 60a and 60b.

And, a perforated hole 66a corresponding to each of the locking holes 620a provided to the locking parts 600 of the upper and lower insulators 60a and 60b is provided to the rigidity reinforcement bracket 66.

Moreover, an outside diameter of the reinforcement bracket 66 is formed equal to or smaller than an inside diameter of the ring type helical core HC.

Namely, the rigidity reinforcement bracket 55 is inserted between the upper and lower insulators 60a and 60b without causing any assembly interference with the upper and lower insulators 60a and 60b.

A plurality of recesses 152 are provided to the base 150 of the helical core HC to facilitate a winding work for core formation by reducing stress. And, the helical core HC is riveted by rivets 153 respectively penetrating perforated holes provided to the base 150.

A winding beginning portion of the helical core HC and a winding end portion of the helical core HC can be welded to prescribed contact portions of the base, respectively.

Figure 7:
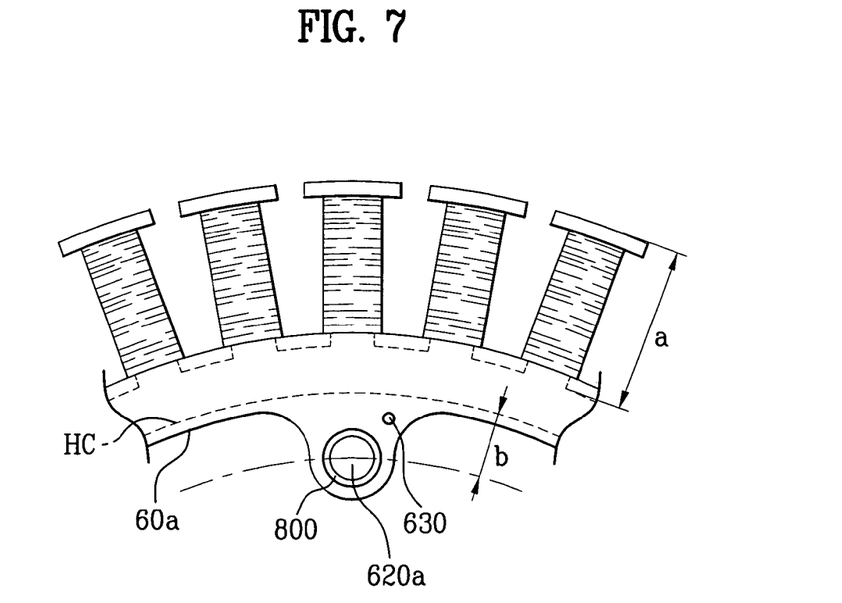
FIG. 7 is a layout of the stator in FIG. 4.

Referring to FIG. 7, the stator 6 according to the present invention includes the at least three locking parts 600 built in one body of the upper and lower insulators 60a and 60b to be projected from the inner circumference of the core in an inner radial direction. If a length of each of the teeth 151 projected from a lateral outside of the helical core HC is set to 'a' and if a distance from a lateral inside of the helical core to a center of the locking hole of the locking part 600 is set to 'b'm, the locking part 600 is formed to meet a definition of '$a \geqq b$'.

Meanwhile, a reference number '8' in FIG. 5 indicates a hole sensor assembly for a motor control and a reference number '9' indicates a tap housing assembly for power connection to supply power to the stator side.

An operation of the above-configured present invention is explained as follows.

First of all, the helical core, which is formed in a manner of helically rotating to stack the steel plate including the teeth 151 and the base 150, is used as the core 15 configuring the stator. Hence, the present invention does not need the processes of assembling and welding unit cores for the sectional core, thereby simplifying the fabricating process.

And, the helical core HC according to the present invention has not the protrusions of the sectional core, thereby reducing the material loss.

Namely, the method of fabricating the stator of the present invention is simple and reduces the material loss.

Moreover, the rigidity reinforcement bracket 66 is inserted between the upper and lower insulators 60a and 60b to raise the rigidity of the upper and lower insulators 60a and 60b against the bending and distortion of the stator 6, thereby enhancing reliability of the stator 6.

Besides, the stator 6 of the present invention has sufficient rigidity against the locking force of the bolt in a manner of improving the structure of the upper and lower insulators 60a and 60b without forming the protrusion for standing the locking force in fixing the stator 6 to the core itself.

Namely, the present invention provides the structure playing the same role of the protrusion to the locking part 600 of the upper and lower insulators 60a and 60b, thereby enabling the stator 6 to which the helical core HC is applicable.

And, the spaces 640 between the respective ribs 650, 660, 670, and 680 absorb and attenuate the vibration generated from driving the motor, thereby enhancing mechanical reliability of the stator 6 as well as contributing to the reduction of the insulator material.

Meanwhile, the support rib 650, which is provided in the circumferential direction to each of the insides of the non-exposed surfaces of the upper and lower insulators 60a and 60b contacting with the top and bottom surfaces of the helical core HC, respectively, supports the lateral inside of the stator core 15.

And, the reinforcement rib 660 is provided to the locking part 600 of the upper and lower insulators 60a and 60b to connect the boss 620 configuring the locking hole 620a to the support rib 650, thereby distributing the locking force concentrated on the boss 620 and reinforcing rigidity of the locking part 600.

Therefore, even if the stator of a motor for a high capacity drum type washer weighs over 1.5 kg and even if a dewatering rotational speed of the washer is 600~2,000 RPM, the connecting part of the stator 6 according to the present invention is prevented from being broken by the vibration of high speed rotation and the shake and transformation of the rotor 5.

And, the location setting projection 630 provided to the periphery of the locking hole 620a of the locking part 600 engages with the location setting recess of tub, thereby facilitating the coupling of the stator 6.

Hence, the location setting projection 630 facilitates the stator 6 according to the present invention to be coupled with the tub 2, whereby a maintenance and repair work can be easily done by a serviceman for after-service.

Alternatively, it is a matter of course that the location setting projection 630 and the location setting recess can be provided to the tub 2 and the locking part 600, respectively.

Figure 8A:
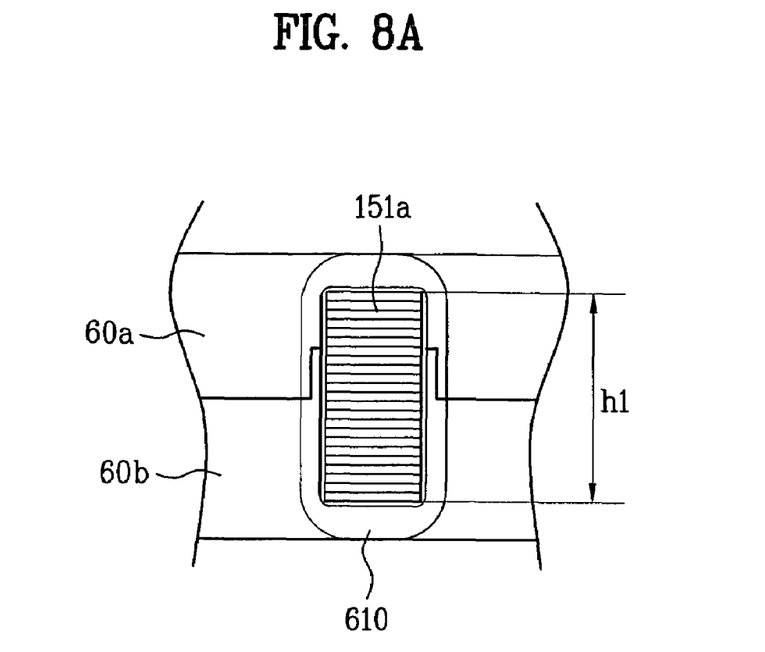
FIG. 8A and FIG. 8B are front diagrams of an insulator for common use.
Figure 8B:
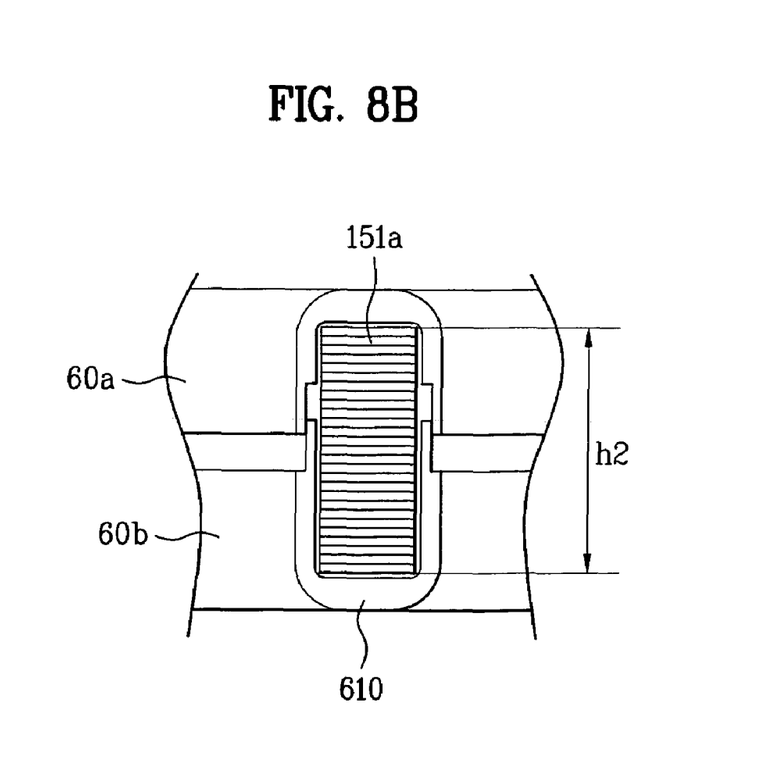

FIG. 8A and FIG. 8B are front diagrams of an insulator for common use, in which the upper and lower insulators 60a and 60b of the present invention is applicable despite a stacked height variation of the helical core HC within a prescribed range.

Referring to FIG. 8A, a stacked height h1 of the core corresponds to a height in case that the stepped portions 610a and 610b of the upper and lower insulators 60a and 60b completely engage with each other.

Referring to FIG. 8B, since a staked height h2 of the core is higher than that in FIG. 8A, the stepped portions 610a and 610b of the upper and lower insulators 60a and 60b fail to completely engage with each other but a gap is provided in-between.

Even if the stacked height h2 of the core is greater than the height of the completely engaging stepped portions 601a and 610b of the upper and lower insulators 60a and 60b to provide the gap between the stepped portions 610a and 610b, the insulation of the core teeth 151 can be achieved.

Hence, the separable upper and lower insulators of the present invention is commonly usable regardless of the stacked height of the core within the prescribed range, thereby contributing to the enhancement of work efficiency in the assembly line.

Meanwhile, another embodiment of the present invention is explained with reference to FIGS. 9 to 13 as follows.

Figure 9:
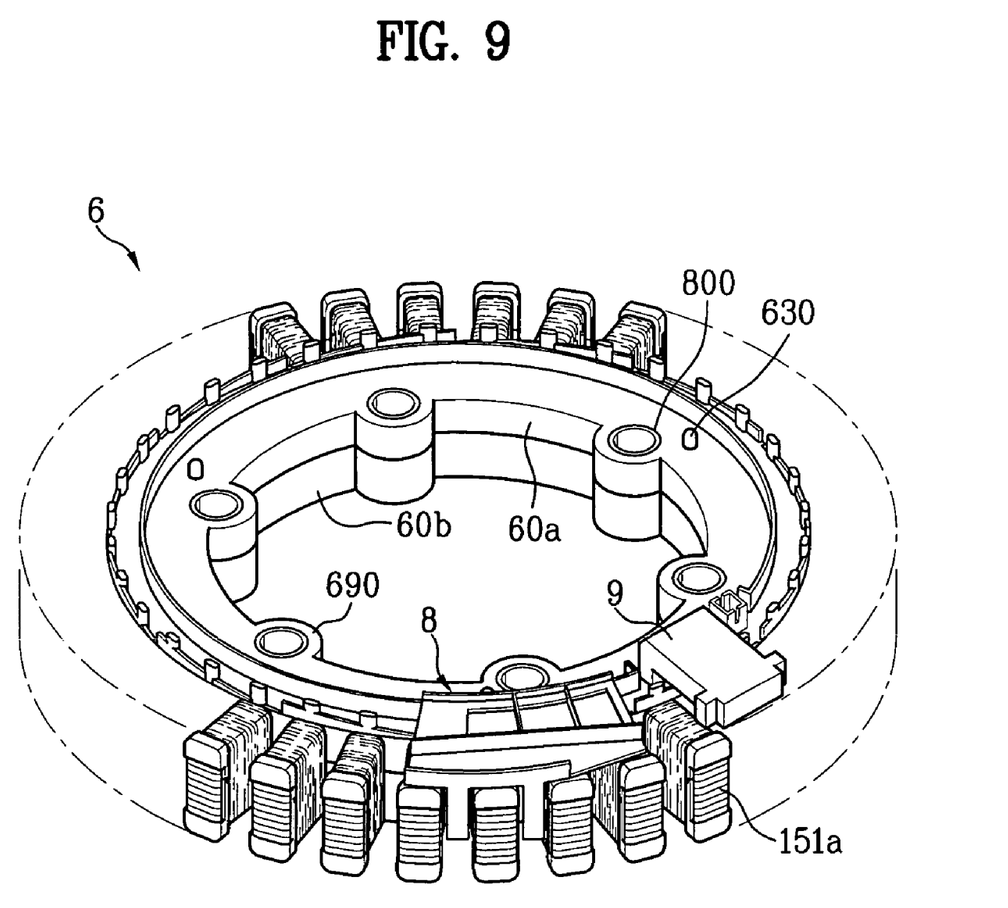
FIG. 9 is a perspective diagram of a stator according to another the present invention.
Figure 10:
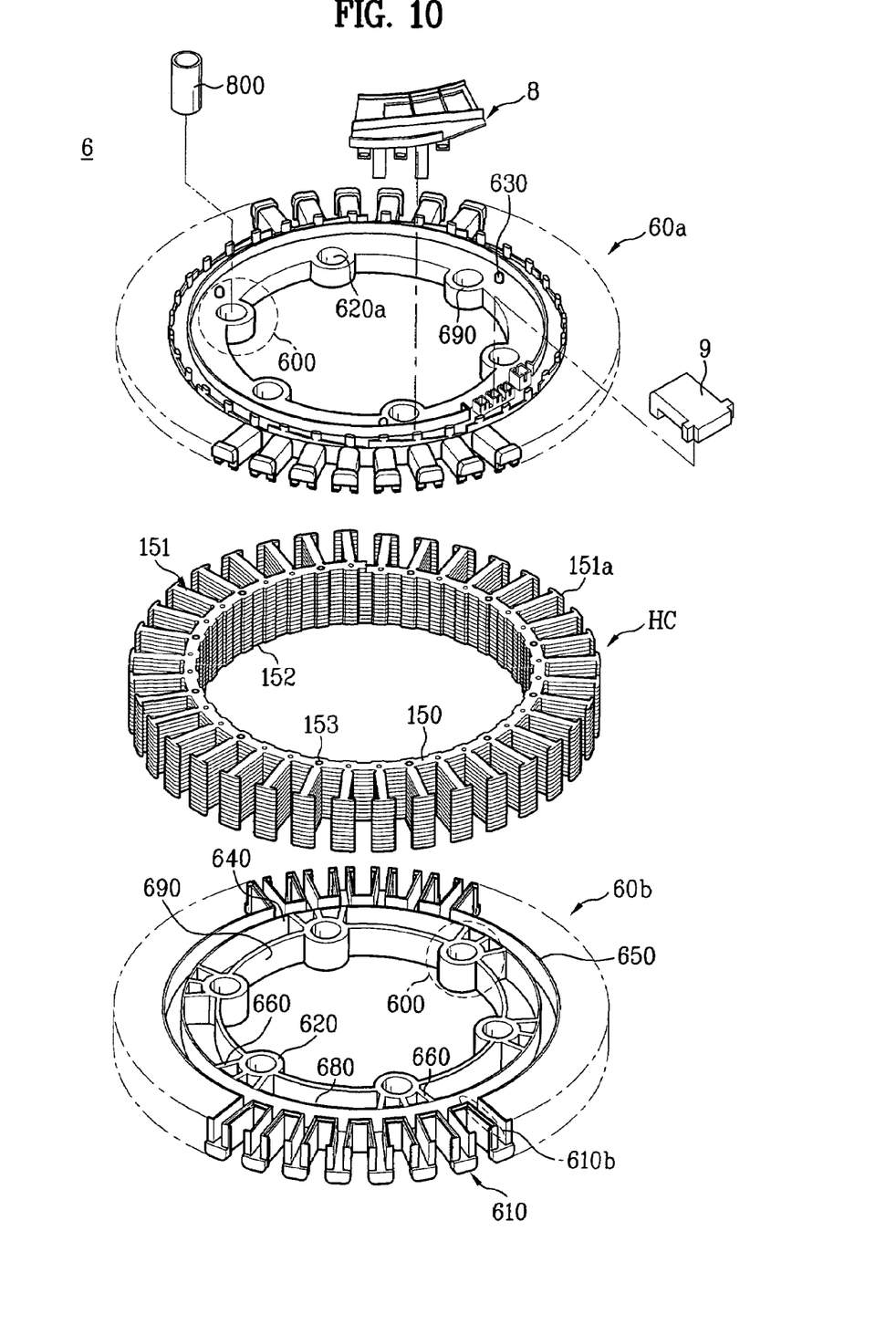
FIG. 10 is a projected perspective diagram of the stator in FIG. 9.
Figure 11:
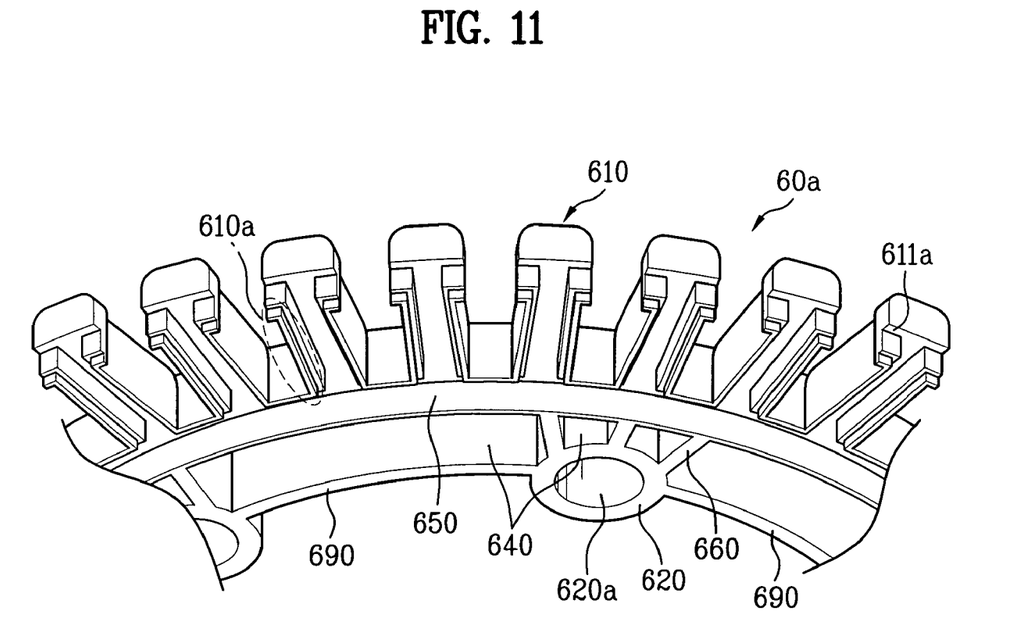
FIG. 11 is a perspective diagram of a backside of an upper insulator in FIG. 10.

FIG. 9 is a perspective diagram of a stator according to another the present invention, FIG. 10 is a projected perspective diagram of the stator in FIG. 9, and FIG. 11 is a perspective diagram of a backside of an upper insulator in FIG. 10.

Figure 12:
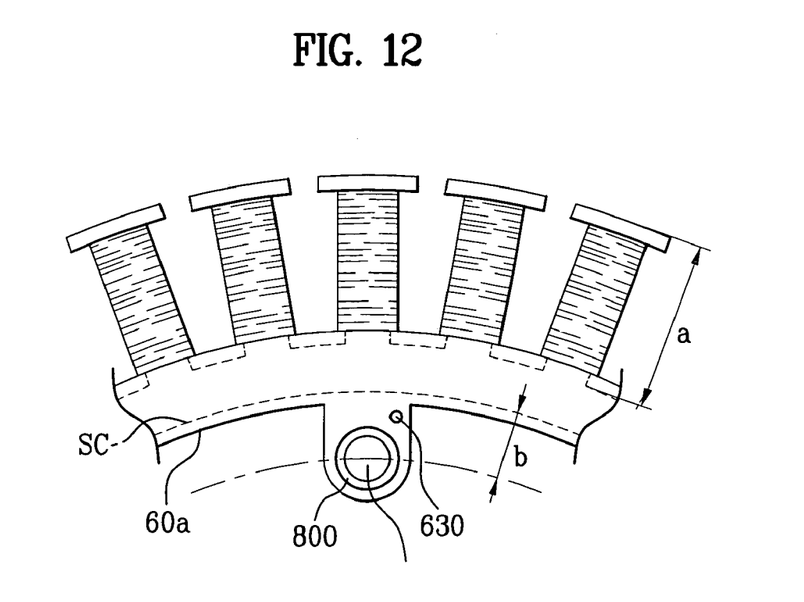
FIG. 12 is a layout of the stator in FIG. 9.
Figure 13A:
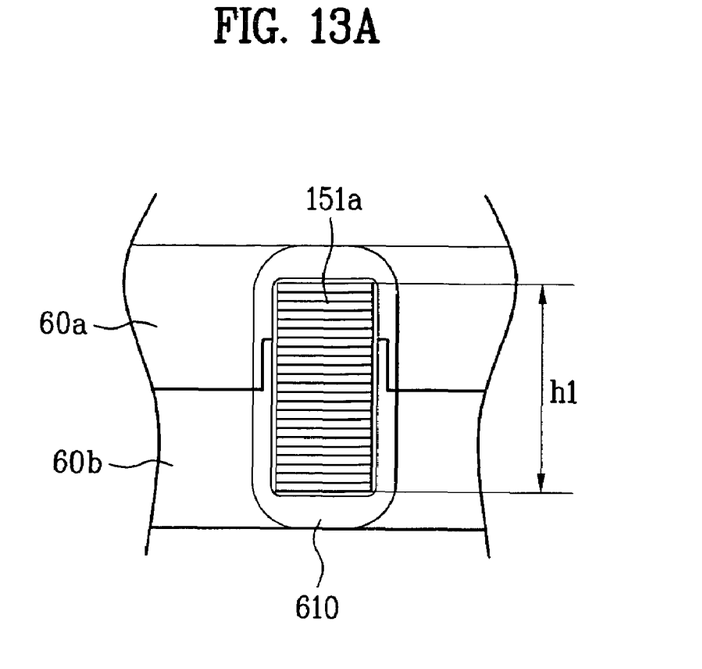
FIG. 13A and FIG. 13B are front diagrams of an insulator for common use.
Figure 13B:
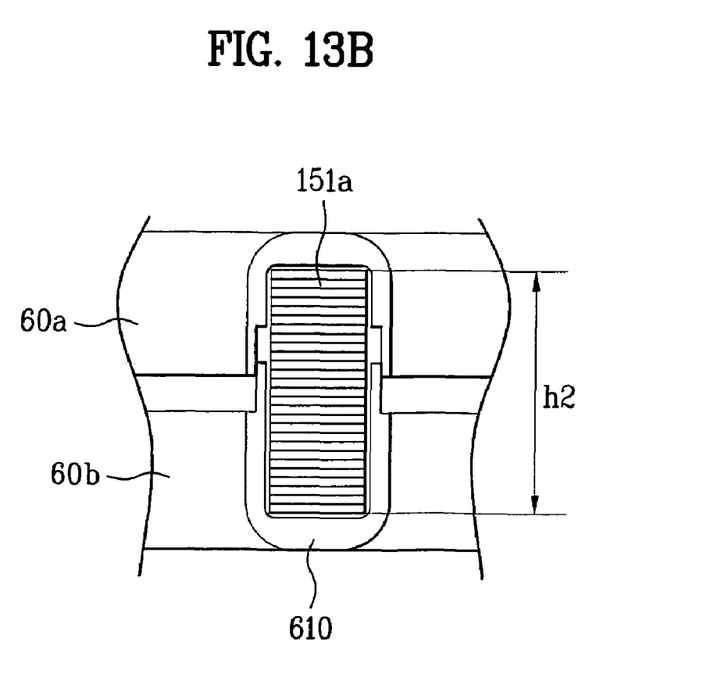

FIG. 12 is a layout of the stator in FIG. 9 and FIG. 13A and FIG. 13B are front diagrams of an insulator for common use.

A stator of an outer rotor type motor according to another embodiment of the present invention almost has the same elements of that according to the former embodiment of the present invention. Hence, explanations of the like parts are skipped but the characterized parts of the stator according to another embodiment of the present invention are described in the following.

First of all, a stator of an outer rotor type motor according to another embodiment of the present invention includes a guide rib 690 provided to each inside of non-exposed surfaces of the upper and lower insulators 60a and 60b contacting with top and bottom of the spiral core SC to connect the adjacent bosses 630, thereby distributing the locking force focused on the bosses and reinforcing the rigidity off the locking parts 600.

In this case, the guide rib 690 lies between the adjacent bosses 620 to connect them. A virtual line extending from each end of the guide rib 690 is set to pass through a center of the corresponding locking hole 620a. And, an overall connected shape of the guide rib 690 forms a circle.

An operation of another embodiment of the present invention is explained as follows.

First of all, the spiral core SC, which is formed in a manner of helically rotating to stack the steel plate including the teeth 151 and the base 150, is used as the core 15 configuring the stator. Hence, the present invention does not need the processes of assembling and welding unit cores for the sectional core (DC), thereby simplifying the fabricating process.

And, the spiral core of the present invention has not the protrusions of the sectional core, thereby reducing the material loss.

Namely, the method of fabricating the stator of the present invention is simple and reduces the material loss.

Moreover, the stator 6 of the present invention has sufficient rigidity against the locking force of the bolt in a manner of improving the structure of the upper and lower insulators 60a and 60b without forming the protrusion for standing the locking force in fixing the stator 6 to the core itself.

Namely, the present invention provides the structure playing the same role of the protrusion to the locking part 600 of the upper and lower insulators 60a and 60b, thereby enabling the stator 6 to which the spiral core SC is applicable.

And, the spaces 640 between the respective ribs 650, 660, 670, and 680 absorb and attenuate the vibration generated from driving the motor, thereby enhancing mechanical reliability of the stator 6 as well as contributing to the reduction of the insulator material.

Moreover, the spaces 640 can be filled up with a vibration isolator to further raise the shock-absorbing and attenuating actions for the vibration occurring on driving the motor.

Meanwhile, the support rib 650, which is provided in the circumferential direction to each of the insides of the non-exposed surfaces of the upper and lower insulators 60a and 60b contacting with the top and bottom surfaces of the spiral core, respectively, supports the lateral inside of the stator core 15.

And, the reinforcement rib 660 is provided to the locking part 600 of the upper and lower insulators 60a and 60b to connect the boss 620 configuring the locking hole 620a to the support rib 650, thereby distributing the locking force concentrated on the boss 620 and reinforcing rigidity of the locking part 600.

Moreover, the guide rib 690, which is provided inner than the support rib 650 to connect the adjacent bosses 620, distributes the locking force concentrated on the bosses 620 and further reinforces the rigidity of the locking parts 600.

Therefore, even if the stator of a motor for a high capacity drum type washer weighs over 1.5 kg and even if a dewatering rotational speed of the washer is 600~2,000 RPM, the connecting part of the stator 6 according to the present invention is prevented from being broken by the vibration of high speed rotation and the shake and transformation of the rotor 5.

And, the location setting projection 630 provided to the periphery of the locking hole 620a of the locking part 600 engages with the location setting recess of tub, thereby facilitating the coupling of the stator 6.

Hence, the location setting projection 630 facilitates the stator 6 according to the present invention to be coupled with the tub 2, whereby a maintenance and repair work can be easily done by a serviceman for after-service.

Alternatively, it is a matter of course that the location setting projection 630 and the location setting recess can be provided to the tub 2 and the locking part 600, respectively.

FIG. 13A and FIG. 13B are front diagrams of an insulator for common use, in which the upper and lower insulators 60a and 60b of the present invention is applicable despite a stacked height variation of the spiral core SC within a prescribed range.

Hence, the separable upper and lower insulators of the present invention is commonly usable regardless of the stacked height of the core within the prescribed range, thereby contributing to the enhancement of work efficiency in the assembly line.

Accordingly, the present invention provides the following effects or advantages.

First of all, the material and weight for fabrication of the stator of the BLDC motor for the drum type washer are reduced, the fabrication process is simplified, and the stator can be stably assembled to the fixing side such as a tub.

Specifically, the stator can be stably assembled to the fixing side such as a tub or a bearing housing like the case of applying the sectional core, whereby the stator weighing at least 1.5 kg is applicable to a drum type washer BLDC motor having a rotational speed over 2,000 RPM.

Secondly, the stator is facilitated to be assembled to the tub in the assembly line, whereby a maintenance and repair work of a serviceman can be easily done for after-service.

Thirdly, the rigidity reinforcement bracket is provided between the upper and lower insulators to raise the rigidity of the upper and lower insulators against the bending and distortion caused to the stator. Hence, the rigidity of the stator including the upper and lower insulators is raised as well to reduce the noise and vibration, whereby the mechanical reliability and endurance can be enhanced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stator of an outer rotor type motor for a drum type washer, comprising:
    a ring type helical core having a multi-layer structure configured by helically winding to stack a steel plate, which comprises a strap type base and teeth protruding from the base, from a bottom layer to a top layer;
    an upper insulator having a shape corresponding to a shape of the helical core to enclose an upper part of the helical core and formed of an electrically insulating material;
    a lower insulator having a shape corresponding to the shape of the helical core to enclose a lower part of the helical core in being assembled to the upper insulator reciprocally and formed of the electrically insulating material;
    at least one locking part built in one body of the upper and lower insulators and projected from an inside of the helical core toward a center of the stator to fix the stator to a fixing side of a tub; and
    a rigidity reinforcement bracket provided between the upper and lower insulators.

2. The stator of claim 1, wherein a locking hole is provided to the locking part to fix the stator to the fixing side of the tub via a locking member.

3. The stator of claim 2, wherein the rigidity reinforcement bracket has a shape of hollow disc and is provided with a perforated hole corresponding to the locking hole of the locking part of the upper and lower insulators.

4. The stator of claim 3, wherein an outside diameter of the rigidity reinforcement bracket is equal to or smaller than an inside diameter of the ring type helical core.

5. The stator of claim 2, wherein the locking hole of the locking part is formed by a boss projected from a non-exposed side.

6. The stator of claim 1, wherein a support rib is provided in a circumferential direction to each radial inside of non-exposed surfaces of the upper and lower insulators contacting with top and bottom of the helical core, respectively to support a lateral inside of the helical core.

7. The stator of claim 6, wherein at least one reinforcement rib is provided to the locking part of the upper and lower insulators to connect the boss configuring the locking hole to the support rib, thereby distributing a locking force concentrated on the boss and reinforcing rigidity of the corresponding locking part.

8. The stator of claim 1, wherein a pair of stepped portions are provided to each sidewall of each of the teeth of the upper insulator and the lower insulator, respectively to engage with each other to form a same plane in assembling the upper and lower insulators.

9. The stator of claim 8, wherein if one of a pair of the stepped portions has a '⌐' shape lateral side, the other has a '⌊' shape lateral side.

10. The stator of claim 1, wherein a pair of stepped portions are provided to a tip sidewall approximately vertical to each sidewall of each of the teeth of the upper and lower insulators, respectively to engage with each other to form a same plane in assembling the upper and lower insulators.

11. The stator of claim 1, wherein a loading surface protrudes from an outside of a tip sidewall of each of the teeth of the upper and lower insulators to have a core shoe of the helical core loaded thereon.

12. The stator of claim 1, wherein a location setting projection is provided to a periphery of the locking hole of the locking part of the upper insulator to engage with a location setting recess or hole provided to the fixing side.

13. The stator of claim 1, wherein a cylindrical sleeve is provided inside the locking hole.

14. The stator of claim 13, wherein the cylindrical sleeve is a spring pin having elasticity by a portion of an outer circumference cut along a length direction.

15. The stator of claim 13, wherein the cylindrical sleeve is a hollow pin forcibly inserted into the locking hole.

16. The stator of claim 1, wherein at least one recess is provided to the base of the helical core to reduce stress in winding the core.

17. The stator of claim 1, wherein the helical core is riveted by at least one rivet penetrating at least one perforated hole provided to the base.

18. The stator of claim 1, wherein a winding beginning portion of the helical core and a winding end portion of the helical core is welded to prescribed contact portions of the base, respectively.

19. The stator of claim 1, wherein if a length of each of the teeth projected from a lateral outside of the helical core is set to 'a' and if a distance from a lateral inside of the helical core to a center of a locking hole of a locking part is set to 'b', 'a' is equal to or greater than 'b' ($a \geq b$).

20. A stator of an outer rotor type motor for a drum type washer, comprising:
    a ring type helical core having a multi-layer structure configured by helically winding to stack a steel plate, which comprises a strap type base and teeth protruding from the base, from a bottom layer to a top layer;

an upper insulator having a shape corresponding to a shape of the helical core to enclose an upper part of the helical core and formed of an electrically insulating material;

a lower insulator having a shape corresponding to the shape of the helical core to enclose a lower part of the helical core in being assembled to the upper insulator reciprocally and formed of the electrically insulating material;

at least one locking part built in one body of the upper and lower insulators and projected from an inside of the helical core toward a center of the stator to fix the stator to a fixing side of a tub;

a locking hole provided to the locking part to fix the stator to the fixing side of the tub via a locking member; and a rigidity reinforcement bracket provided between the upper and lower insulators.

21. A stator of an outer rotor type motor for a drum type washer, comprising:

a ring type helical core having a multi-layer structure configured by helically winding to stack a steel plate, which comprises a strap type base and teeth protruding from the base, from a bottom layer to a top layer;

an upper insulator having a shape corresponding to a shape of the helical core to enclose an upper part of the helical core and formed of an electrically insulating material;

a lower insulator having a shape corresponding to the shape of the helical core to enclose a lower part of the helical core in being assembled to the upper insulator reciprocally and formed of the electrically insulating material;

at least one locking part built in one body of the upper and lower insulators and projected from an inside of the helical core toward a center of the stator to fix the stator to a fixing side of a tub;

a boss provided to the locking part to form a locking hole for fixing the stator to the fixing side of the tub via a locking member; and a guide rib provided to each inside of non-exposed surfaces of the upper and lower insulators contacting with top and bottom of the spiral core to connect the adjacent bosses, the guide rib distributing the locking force focused on the bosses and reinforcing the rigidity off the locking parts.

22. The stator of claim 21, wherein the guide rib is connected to each outside of the bosses and a virtual line extending from each end of the guide rib is set to pass through a center of the corresponding locking hole.

23. The stator of claim 22, wherein an overall connected shape of the guide rib approximately forms a circle.

24. The stator of claim 21, wherein a support rib is provided in a circumferential direction to each radial inside of non-exposed surfaces of the upper and lower insulators contacting with top and bottom of the helical core, respectively to support a lateral inside of the helical core.

25. The stator of claim 24, wherein at least one reinforcement rib is provided to the locking part of the upper and lower insulators to connect the boss configuring the locking hole to the support rib, thereby distributing a locking force concentrated on the boss and reinforcing rigidity of the corresponding locking part.

26. The stator of claim 21, wherein a pair of stepped portions are provided to each sidewall of each of the teeth of the upper insulator and the lower insulator, respectively to engage with each other to form a same plane in assembling the upper and lower insulators.

27. The stator of claim 26, wherein if one of a pair of the stepped portions has a ']' shape lateral side, the other has a '[' shape lateral side.

28. The stator of claim 21, wherein a pair of stepped portions are provided to a tip sidewall approximately vertical to each sidewall of each of the teeth of the upper and lower insulators, respectively to engage with each other to form a same plane in assembling the upper and lower insulators.

29. The stator of claim 21, wherein a loading surface protrudes from an outside of a tip sidewall of each of the teeth of the upper and lower insulators to have a core shoe of the helical core loaded thereon.

30. The stator of claim 21, wherein a location setting projection is provided to a periphery of the locking hole of the locking part of the upper insulator to engage with a location setting recess or hole provided to the fixing side.

31. The stator of claim 21, wherein a cylindrical sleeve is provided inside the locking hole.

32. The stator of claim 31, wherein the cylindrical sleeve is a spring pin having elasticity by a portion of an outer circumference cut along a length direction.

33. The stator of claim 31, wherein the cylindrical sleeve is a hollow pin forcibly inserted into the locking hole.

34. The stator of claim 21, wherein at least one recess is provided to the base of the helical core to reduce stress in winding the core.

35. The stator of claim 21, wherein the helical core is riveted by at least one rivet penetrating at least one perforated hole provided to the base.

36. The stator of claim 21, wherein a winding beginning portion of the helical core and a winding end portion of the helical core is welded to prescribed contact portions of the base, respectively.

37. The stator of claim 21, wherein if a length of each of the teeth projected from a lateral outside of the helical core is set to 'a' and if a distance from a lateral inside of the helical core to a center of a locking hole of a locking part is set to 'b', 'a' is equal to or greater than 'b' (a≧b).

38. A stator of an outer rotor type motor for a drum type washer, comprising:

a ring type helical core having a multi-layer structure configured by helically winding to stack a steel plate, which comprises a strap type base and teeth protruding from the base, from a bottom layer to a top layer;

an upper insulator having a shape corresponding to a shape of the helical core to enclose an upper part of the helical core and formed of an electrically insulating material;

a lower insulator having a shape corresponding to the shape of the helical core to enclose a lower part of the helical core in being assembled to the upper insulator reciprocally and formed of the electrically insulating material;

at least three locking parts built in one body of the upper and lower insulators and projected from an inside of the helical core toward a center of the stator to fix the stator to a fixing side of a tub;

a rigidity reinforcement bracket provided between the upper and lower insulators; and a guide rib provided to each inside of non-exposed surfaces of the upper and lower insulators contacting with top and bottom of the spiral core to connect the adjacent bosses, the guide rib distributing the locking force focused on the bosses and reinforcing the rigidity off the locking parts.

39. The stator of claim 38, wherein a locking hole is provided to each of the at least three locking parts to fix the stator to the fixing side of the tub via a locking member.

40. The stator of claim 38, wherein the rigidity reinforcement bracket has a shape of hollow disc and is provided with a perforated hole corresponding to the locking hole of the locking part of the upper and lower insulators.

41. The stator of claim 38, wherein the guide rib is connected to each outside of the bosses and a virtual line extending from each end of the guide rib is set to pass through a center of the corresponding locking hole.

* * * * *